(12) United States Patent
Kai

(10) Patent No.: US 11,301,183 B2
(45) Date of Patent: Apr. 12, 2022

(54) COMPUTER-READABLE MEDIUM, INFORMATION PROCESSING DEVICE, AND METHOD FOR INSTALLING APPROPRIATE PROGRAM

(71) Applicant: BROTHER KOGYO KABUSHIKI KAISHA, Nagoya (JP)

(72) Inventor: Takafumi Kai, Aichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/990,090

(22) Filed: Aug. 11, 2020

(65) Prior Publication Data

US 2020/0371729 A1 Nov. 26, 2020

Related U.S. Application Data

(63) Continuation of application No. 16/367,516, filed on Mar. 28, 2019, now Pat. No. 10,747,482.

(30) Foreign Application Priority Data

Mar. 30, 2018 (JP) .............................. JP2018-068437

(51) Int. Cl.
*G06F 3/12* (2006.01)
(52) U.S. Cl.
CPC .......... *G06F 3/1225* (2013.01); *G06F 3/1205* (2013.01); *G06F 3/1228* (2013.01); *G06F 3/1253* (2013.01); *G06F 3/1288* (2013.01)
(58) Field of Classification Search
CPC ............................. G06F 3/1225; G06F 3/1205
See application file for complete search history.

(56) References Cited

U.S. PATENT DOCUMENTS

| 6,406,199 B1 * | 6/2002 | Hayashi ................ G06F 40/106 |
| | | 400/76 |
| 2009/0064198 A1 * | 3/2009 | Kobayashi ......... H04N 1/00278 |
| | | 719/327 |

(Continued)

FOREIGN PATENT DOCUMENTS

| JP | 2014-203268 A | ‡ 10/2014 | ............ G06F 9/4411 |
| JP | 2014-203268 A | 10/2014 | |

OTHER PUBLICATIONS

Office Action dated Jan. 3, 2020 from related U.S. Appl. No. 16/367,526.

(Continued)

*Primary Examiner* — Ibrahim Siddo
(74) *Attorney, Agent, or Firm* — Scully Scott Murphy and Presser

(57) ABSTRACT

A non-transitory computer-readable medium stores computer-readable instructions configured to, when executed by a processor of an information processing device, cause the information processing device to acquire identification information for identifying an OS of the information processing device, using the acquired identification information, determine whether the OS is capable of accepting a driver program for controlling a device, when determining that the OS is capable of accepting the driver program, install the driver program into the OS, and when determining that the OS is incapable of accepting the driver program, download into the information processing device a driverless installer for achieving driverless control of the device without using the driver program.

9 Claims, 11 Drawing Sheets

(56) References Cited

U.S. PATENT DOCUMENTS

| | | | | |
|---|---|---|---|---|
| 2012/0245447 A1* | 9/2012 | Karan | .............. | G01N 33/48792 600/365 |
| 2012/0331202 A1* | 12/2012 | Cohen | .................. | G06F 13/102 710/313 |
| 2014/0300928 A1‡ | 10/2014 | Hirakawa | ............. | G06F 9/4411 358/1 |
| 2017/0160995 A1* | 6/2017 | Fukasawa | ............. | G06F 3/1204 |

OTHER PUBLICATIONS

Notice of Allowance dated Apr. 13, 2020 from related U.S. Appl. No. 16/367,526.

* cited by examiner
‡ imported from a related application

| VERSION INFORMATION | DIRECTORY INFORMATION | COMPATIBILITY INFORMATION | EXISTENCE INFORMATION | ADAPTATION INFORMATION | |
|---|---|---|---|---|---|
| 10.15 | NO DIRECTORY | COMPATIBLE | EXISTING | GENERAL PRINT CONTROL PROGRAM | UNAVAILABLE |
| | | | | APPLICATION PROGRAM FOR PRINTING | UNAVAILABLE |
| | | | | USAGE GUIDE INFORMATION | AVAILABLE |
| | | | | ACQUISITION INFORMATION | UNAVAILABLE |
| 10.14 | DIRECTORY PREPARED | COMPATIBLE | NOT EXISTING | GENERAL PRINT CONTROL PROGRAM | AVAILABLE |
| | | | | APPLICATION PROGRAM FOR PRINTING | UNAVAILABLE |
| | | | | USAGE GUIDE INFORMATION | AVAILABLE |
| | | | | ACQUISITION INFORMATION | AVAILABLE |
| 10.13 | DIRECTORY PREPARED | INCOMPATIBLE | NOT EXISTING | GENERAL PRINT CONTROL PROGRAM | AVAILABLE |
| | | | | APPLICATION PROGRAM FOR PRINTING | UNAVAILABLE |
| | | | | USAGE GUIDE INFORMATION | AVAILABLE |
| | | | | ACQUISITION INFORMATION | UNAVAILABLE |
| 9.12 | NO DIRECTORY | INCOMPATIBLE | NOT EXISTING | GENERAL PRINT CONTROL PROGRAM | UNAVAILABLE |
| | | | | APPLICATION PROGRAM FOR PRINTING | AVAILABLE |
| | | | | USAGE GUIDE INFORMATION | AVAILABLE |
| | | | | ACQUISITION INFORMATION | UNAVAILABLE |

FIG. 5

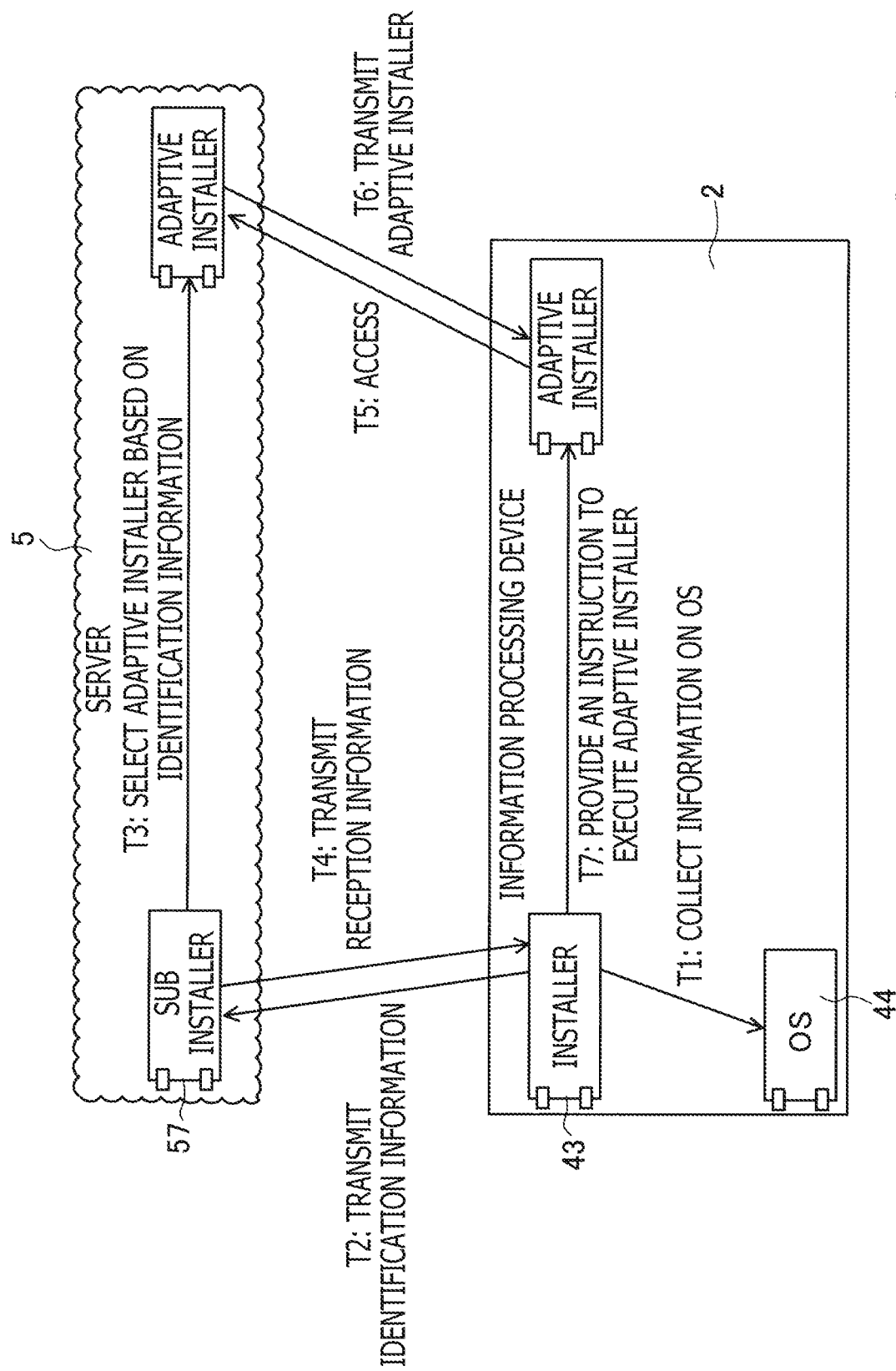

COMPUTER-READABLE MEDIUM, INFORMATION PROCESSING DEVICE, AND METHOD FOR INSTALLING APPROPRIATE PROGRAM

CROSS-REFERENCE TO RELATED APPLICATION

This application is a continuation application of U.S. Ser. No. 16/367,516 filed on Mar. 28, 2019 and claims priority under 35 U.S.C. § 119 from Japanese Patent Application No. 2018-068437 filed on Mar. 30, 2018. The entire subject matter of the application is incorporated herein by reference.

BACKGROUND

Technical Field

Aspects of the present disclosure are related to a non-transitory computer-readable medium, an information processing device, and a method for installing an appropriate program.

Related Art

Technologies have been known in which a program for controlling a device (e.g., a printer and an image scanner) is installed into an information processing device such as a PC. For instance, a technology for installing an appropriate program selected depending on a type of a user interface of the information processing device has been disclosed. Specifically, in the disclosed technology, the information processing device acquires information regarding the user interface, then selects an appropriate program for the type of the user interface identified based on the acquired information, and installs the selected program.

SUMMARY

In recent years, an operating system (hereinafter referred to as an "OS") of an information processing device has been known that provides a driverless environment under which a device may be controlled via a standard program of the OS with no need for a driver program for controlling the device that is supplied from a manufacturer or a vendor of the device. Namely, under the driverless environment, the driver program supplied from the manufacturer or the vendor of the device is not used. In the disclosed technology, the appropriate program to be installed is selected depending on the type of the user interface. Nonetheless, there is room for improvement in the technology, since the technology takes no account of whether the OS of the information processing device is capable of accepting the selected program to be installed.

Aspects of the present disclosure are advantageous to provide one or more improved techniques for installing, into an information processing device, an appropriate program selected based on whether an OS of the information processing device is capable of accepting the program.

According to aspects of the present disclosure, a non-transitory computer-readable medium is provided, which stores computer-readable instructions configured to, when executed by a processor of an information processing device, cause the information processing device to acquire identification information for identifying an OS of the information processing device, using the acquired identification information, determine whether the OS is capable of accepting a driver program for controlling a device, when determining that the OS is capable of accepting the driver program, install the driver program into the OS, and when determining that the OS is incapable of accepting the driver program, download into the information processing device a driverless installer for achieving driverless control of the device without using the driver program.

According to aspects of the present disclosure, further provided is an information processing device including an acquiring means configured to acquire identification information for identifying an OS of the information processing device, a determining means configured to, using the acquired identification information, determine whether the OS is capable of accepting a driver program for controlling a device, an installing means configured to, when the determining means determines that the OS is capable of accepting the driver program, install the driver program into the OS, and a downloading means configured to, when the determining means determines that the OS is incapable of accepting the driver program, download into the information processing device a driverless installer for achieving driverless control of the device without using the driver program.

According to aspects of the present disclosure, further provided is a method implementable on a processor of an information processing device. The method includes acquiring identification information for identifying an OS of the information processing device, determining whether the OS is capable of accepting a driver program for controlling a device, by using the acquired identification information, when determining that the OS is capable of accepting the driver program, installing the driver program into the OS, and when determining that the OS is incapable of accepting the driver program, downloading into the information processing device a driverless installer for achieving driverless control of the device without using the driver program.

BRIEF DESCRIPTION OF THE ACCOMPANYING DRAWINGS

FIG. 5 exemplifies a table stored in the server in the first illustrative embodiment according to one or more aspects of the present disclosure.

FIG. 6 is a sequence diagram showing a specific procedure of an installing process that is achieved through execution of the installation process (see FIG. 3) by the information processing device and execution of the sub installation process (see FIG. 4) by the server, in the first illustrative embodiment according to one or more aspects of the present disclosure.

Figure 7:
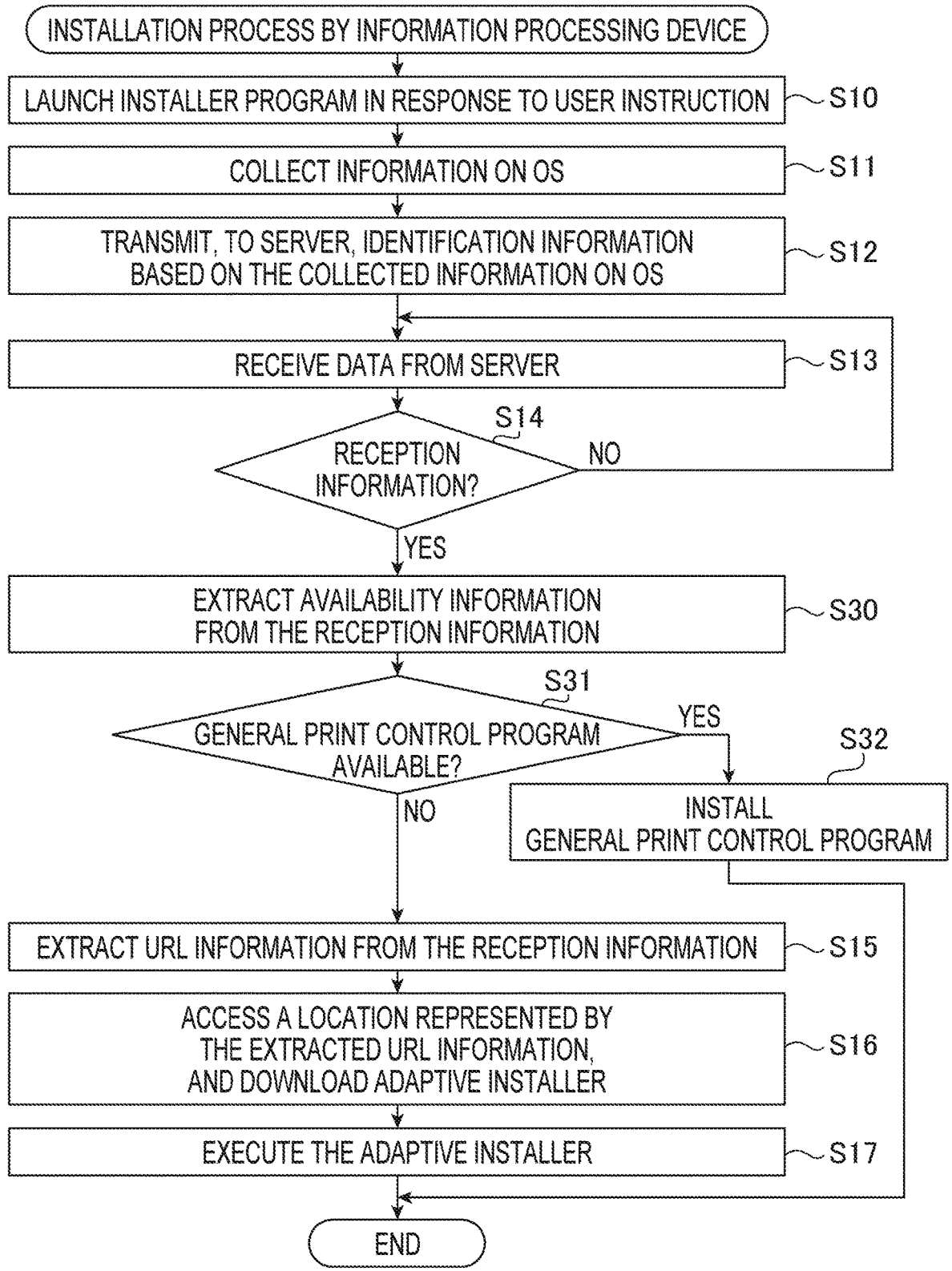

FIG. 7 is a flowchart showing a procedure of an installation process to be performed by the information processing device in a second illustrative embodiment according to one or more aspects of the present disclosure.

Figure 8:
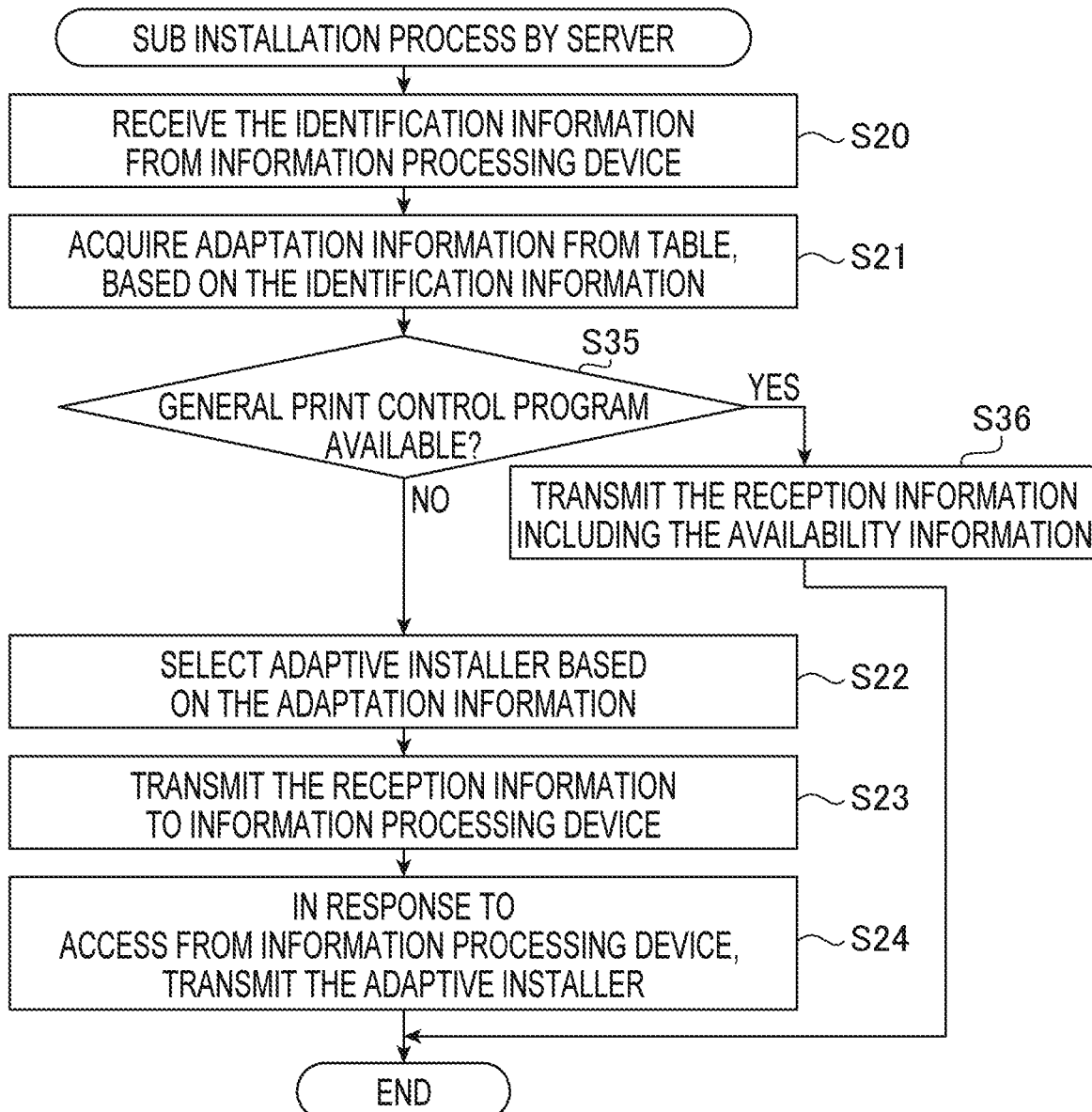

FIG. 8 is a flowchart showing a procedure of a sub installation process to be performed by the server in the second illustrative embodiment according to one or more aspects of the present disclosure.

Figure 9:
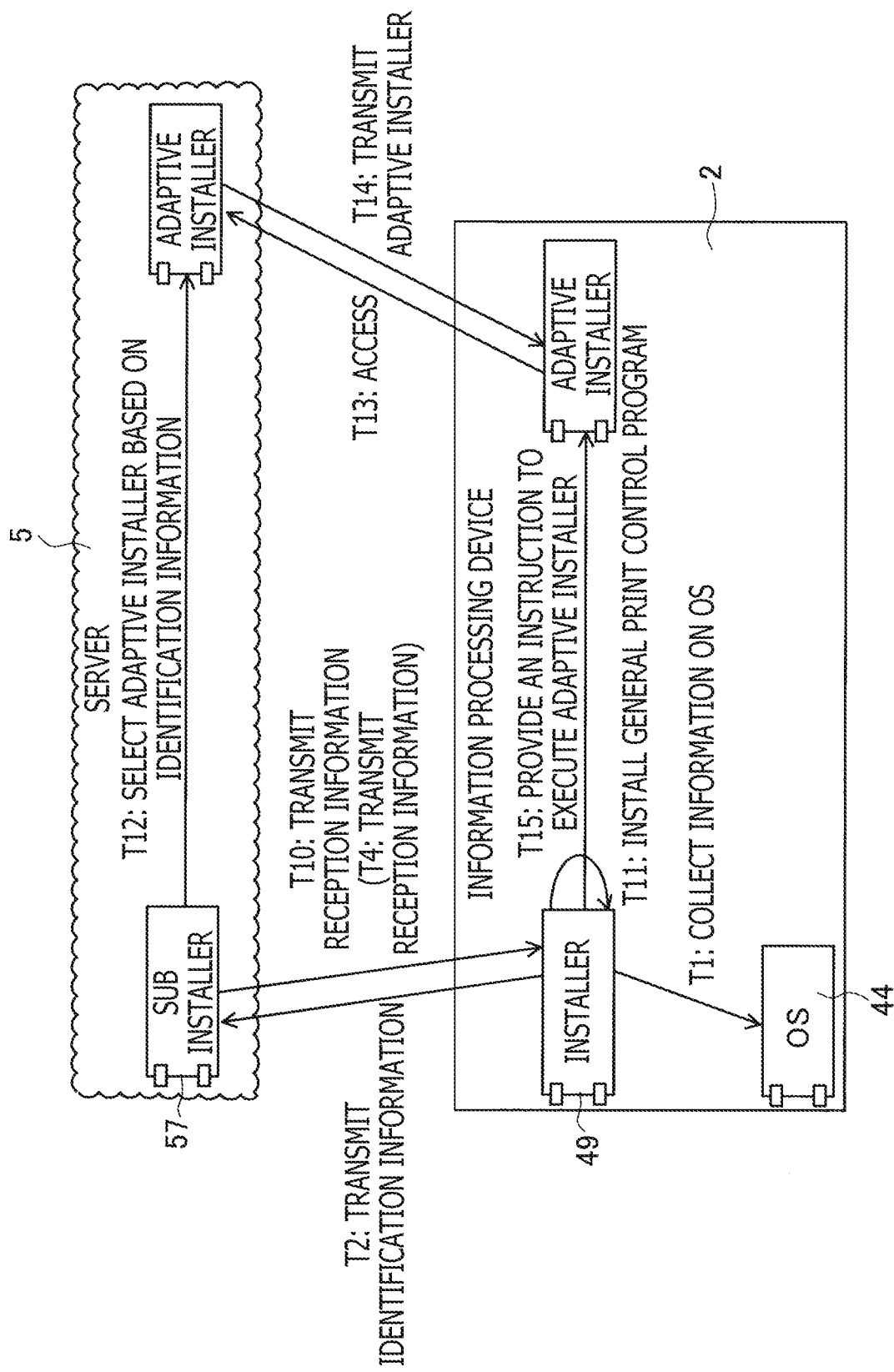

FIG. 9 is a sequence diagram showing a specific procedure of an installing process that is achieved through execution of the installation process (see FIG. 7) by the information processing device and execution of the sub installation process (see FIG. 8) by the server, in the second illustrative embodiment according to one or more aspects of the present disclosure.

Figure 10:
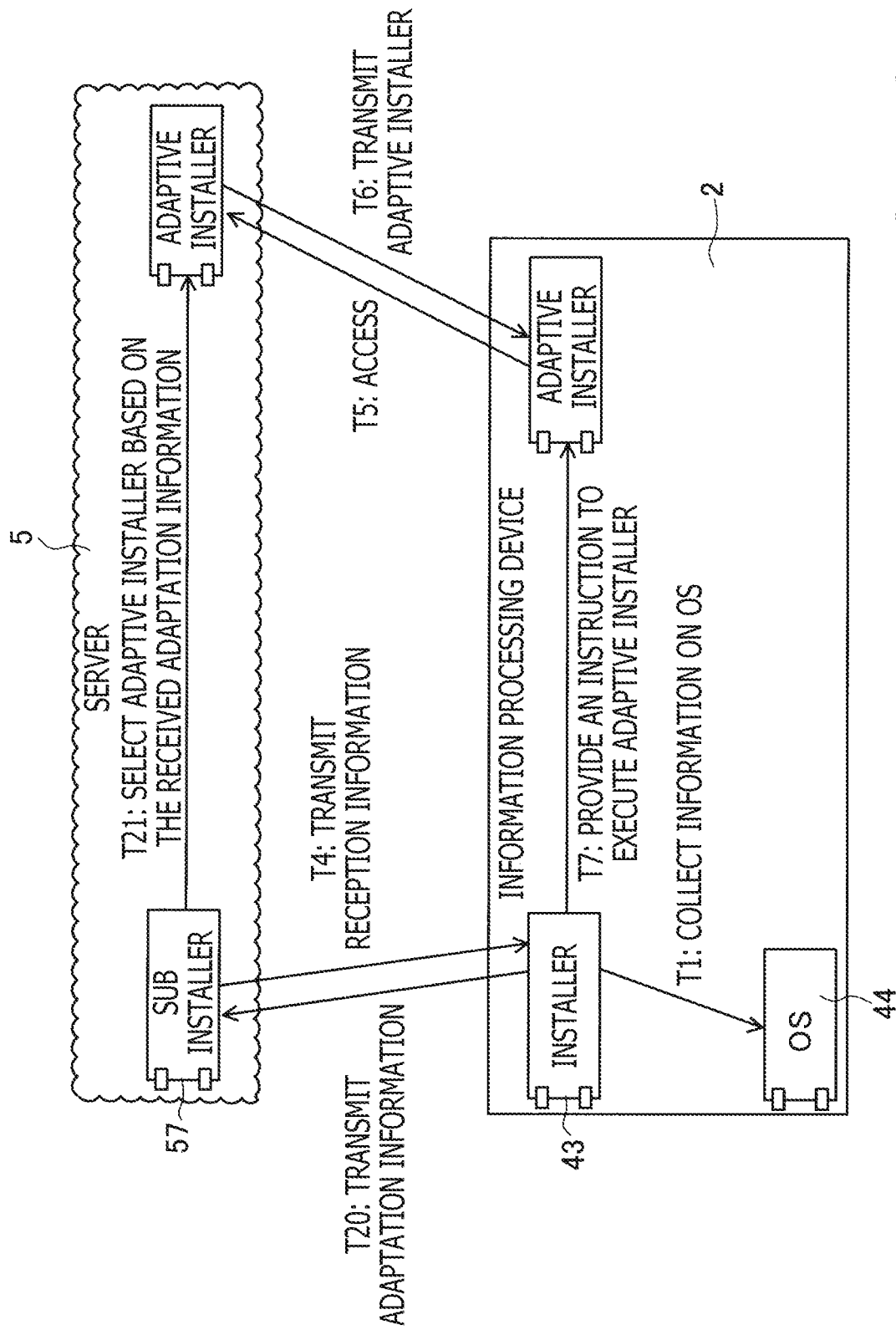

FIG. 10 is a sequence diagram showing a specific procedure of an installing process in a third illustrative embodiment according to one or more aspects of the present disclosure.

Figure 11:
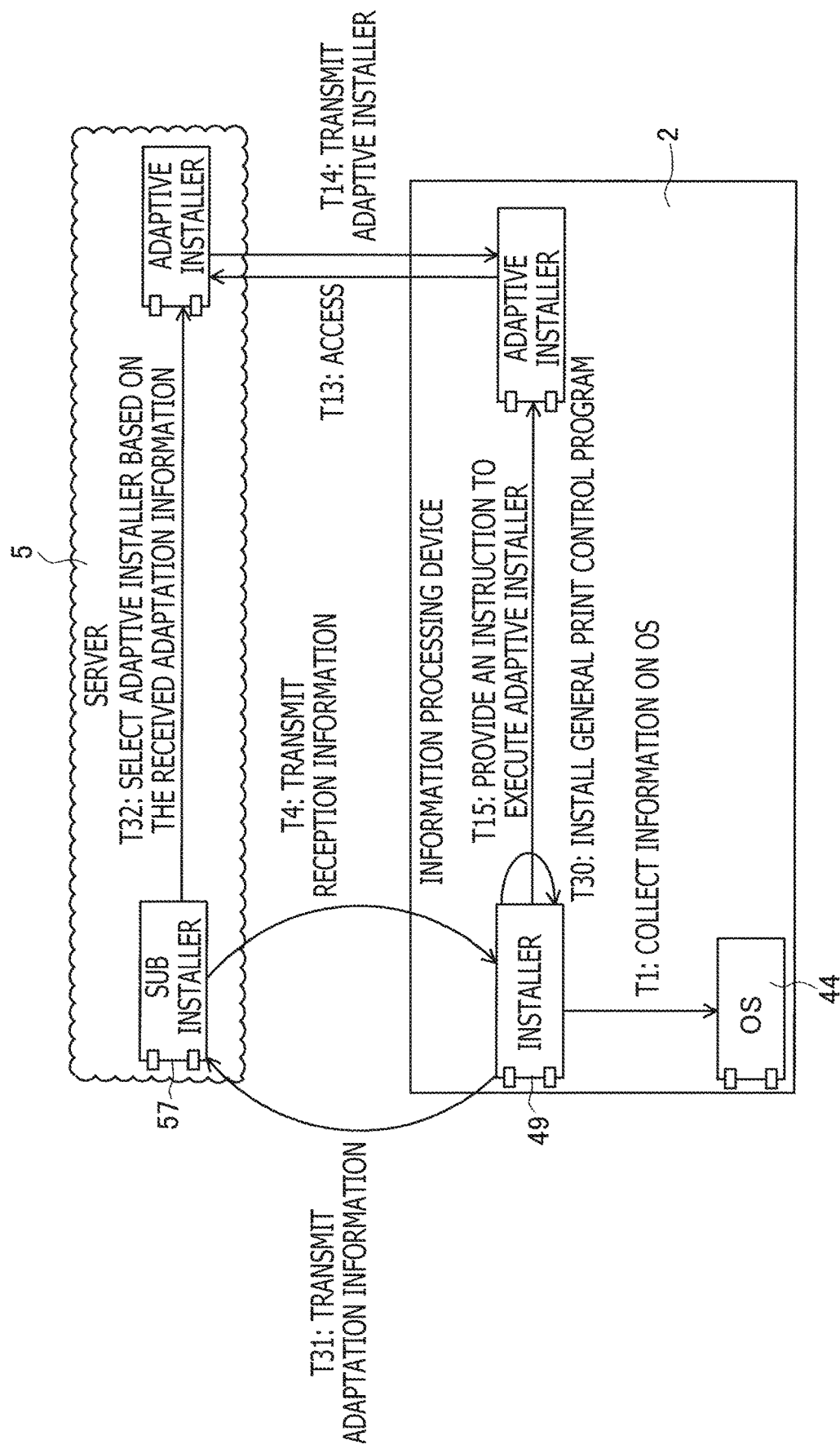

FIG. 11 is a sequence diagram showing a specific procedure of an installing process in a fourth illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

Figure 1:
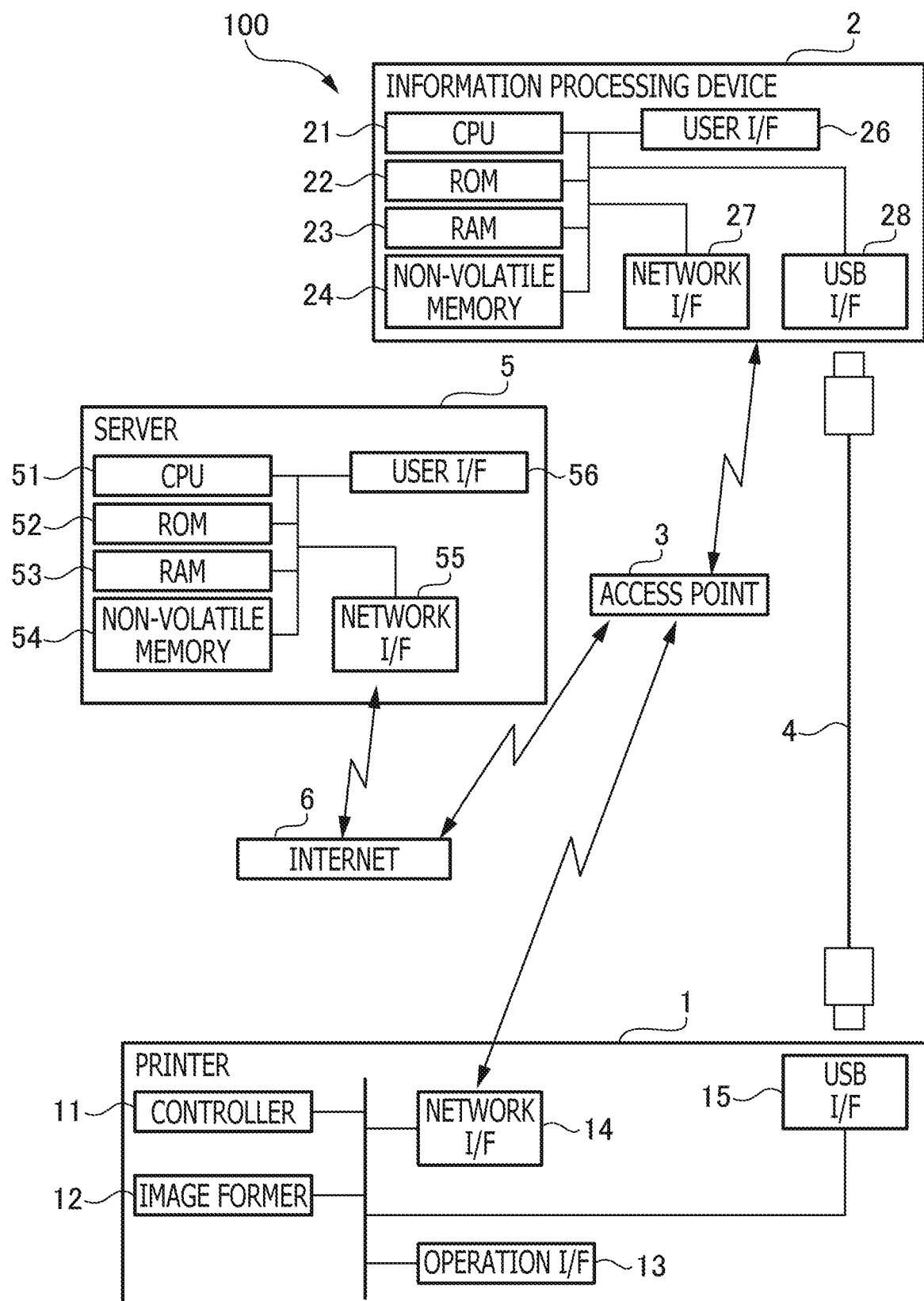
FIG. 1 is a block diagram schematically showing a configuration of a printing system in a first illustrative embodiment according to one or more aspects of the present disclosure.

Hereinafter, a first illustrative embodiment according to aspects of the present disclosure will be described with reference to the accompanying drawings. As shown in FIG. 1, a printing system 100 of the first illustrative embodiment includes a single printer 1 and a single information processing device 2 that are communicably interconnected. Nonetheless, it is noted that the printing system 100 may include one or more of the printers 1 and one or more of the information processing devices 2.

The printer 1 is configured to perform image formation on a print medium. Examples of the printer 1 may include, but are not limited to, a page printer, a copy machine, and a multi-function peripheral. The information processing device 2 is configured to generate and edit image data of an image to be printed by the printer 1 and to transmit a print execution instruction and the image data to the printer 1. Examples of the information processing device 2 may include, but are not limited to, a smartphone, a personal computer, and a tablet computer.

As shown in FIG. 1, the printer 1 includes a controller 11, an image former 12, an operation I/F ("I/F" is an abbreviation of "interface") 13, a network I/F 14, and a USB I/F 15. The controller 11 includes a CPU and one or more memories such as a flash ROM and a RAM. The controller 11 is configured to control each of elements included in the printer 1.

It is noted that the controller 11 may be a general name collectively representing hardware elements (e.g., the CPU) and software elements for controlling the printer 1. Specifically, the controller 11 may include an ASIC ("ASIC" is an abbreviation of "Application Specific Integrated Circuit"). Accordingly, the ASIC may perform a part of the function of the CPU. Further, a logic circuit may perform a part of the function of the controller 11.

Further, a non-volatile memory (e.g., the flash ROM) included in the controller 11 may store one or more programs for controlling each element included in the printer 1.

The image former 12 is configured to form an image on a print medium based on image data transmitted by the information processing device 2. Exemplary image forming methods of the image former 12 may include, but are not limited to, a thermal printing method, an electrophotographic printing method, and an inkjet printing method. Further, the image former 12 may be configured to perform color printing or only monochrome printing.

Specifically, in the first illustrative embodiment, the image former 12 is configured to perform color printing in the inkjet method. In addition, plain papers and photographic sheets are usable as print media for the printer 1.

The operation I/F 13 may include a touch panel configured to accept therethrough an input from a user and display information thereon. Further, the operation I/F 13 may include various display lamps and buttons.

The network I/F 14 includes a wireless communication circuit for wirelessly communicating with the information processing device 2 via an access point 3.

The USB I/F 15 includes a USB communication circuit for communicating with the information processing device 2 via a USB cable 4.

As shown in FIG. 1, the information processing device 2 includes a CPU 21, a ROM 22, a RAM 23, a non-volatile memory 24, a user I/F 26, a network I/F 27, and a USB I/F 28. The ROM 22 stores a boot program. The RAM 23 is usable as a work area when the CPU 21 performs various kinds of processing, and is usable as a temporary storage area for temporarily storing data. The non-volatile memory 24 may include one or more memories such as an HDD and a flash memory. The non-volatile memory 24 stores various programs such as an installer program, and data.

The CPU 21 is configured to perform various kinds of processing in accordance with programs read out from the ROM 22 or the non-volatile memory 24.

For instance, the user I/F 26 may include a display and a touch panel overlaid on the display. The display is configured to display thereon necessary information. The touch panel is configured to accept therethrough an input from the user.

Further or alternatively, the user I/F 26 may include one or more devices (e.g., a keyboard, a mouse, and a display) separate from the information processing device 2. In this case, the information processing device 2 may include interfaces for connecting with the one or more devices.

The network I/F 27 includes a communication circuit for wirelessly communicating with the printer 1 via the access point 3.

In the printing system 100 of the first illustrative embodiment, the printer 1 and the information processing device 2 perform wireless communication complying with Wi-Fi (registered trademark) standards, with each other via the commonly-used access point 3. Namely, the network I/Fs 14 and 27 enable wireless communication complying with the Wi-Fi (registered trademark) standards between the printer 1 and the information processing device 2. More specifically, via the network I/Fs 14 and 27, the printer 1 and the information processing device 2 are allowed to perform wireless communication therebetween in compliance with IEEE 802.11 standards and the equivalent standards.

The USB I/F 28 includes a communication circuit for communicating with the printer 1 via the USB cable 4. Accordingly, when the USB I/Fs 15 and 28 are interconnected via the USB cable 4, the printer 1 and the information processing device 2 are allowed to communicate with each other in a wired manner.

It is noted that the printer 1 and the information processing device 2 may perform mutual communication via a direct wireless connection therebetween without involving the access point 3, or may perform mutual communication via a wired connection therebetween other than the USB connection.

In the first illustrative embodiment, as shown in FIG. 1, the access point 3 is connected with a server 5 via an Internet 6. For instance, the server 5 may be provided by a vendor or a manufacturer of the printer 1.

As shown in FIG. 1, the server 5 includes a CPU 51, a ROM 52, a RAM 53, a non-volatile memory 54, a user I/F 56, and a network I/F 55. The ROM 52 stores a boot program for booting the server 5. The RAM 53 is usable as a work area when the CPU 51 performs various kinds of processing, and is usable as a temporary storage area for temporarily storing data.

The non-volatile memory 54 may include one or more memories such as an HDD and a flash memory. The non-volatile memory 54 stores various programs such as a sub installer program, and data.

The CPU 51 is configured to perform various kinds of processing in accordance with programs read out from the ROM 52 or the non-volatile memory 54. A below-mentioned sub installer 57 (see FIG. 6) is achieved by the CPU 51 executing the sub installer program stored in the non-volatile memory 54.

For instance, the user I/F 56 may include a display and a touch panel overlaid on the display. The display is configured to display thereon necessary information. The touch panel is configured to accept therethrough an input from the user.

Further or alternatively, the user I/F 56 may include one or more devices (e.g., a keyboard, a mouse, and a display) separate from the server 5. In this case, the server 5 may include interfaces for connecting with the one or more devices.

The information processing device 2 may download programs from the server 5 via the Internet 6 and store the programs into the non-volatile memory 24.

Figure 2:
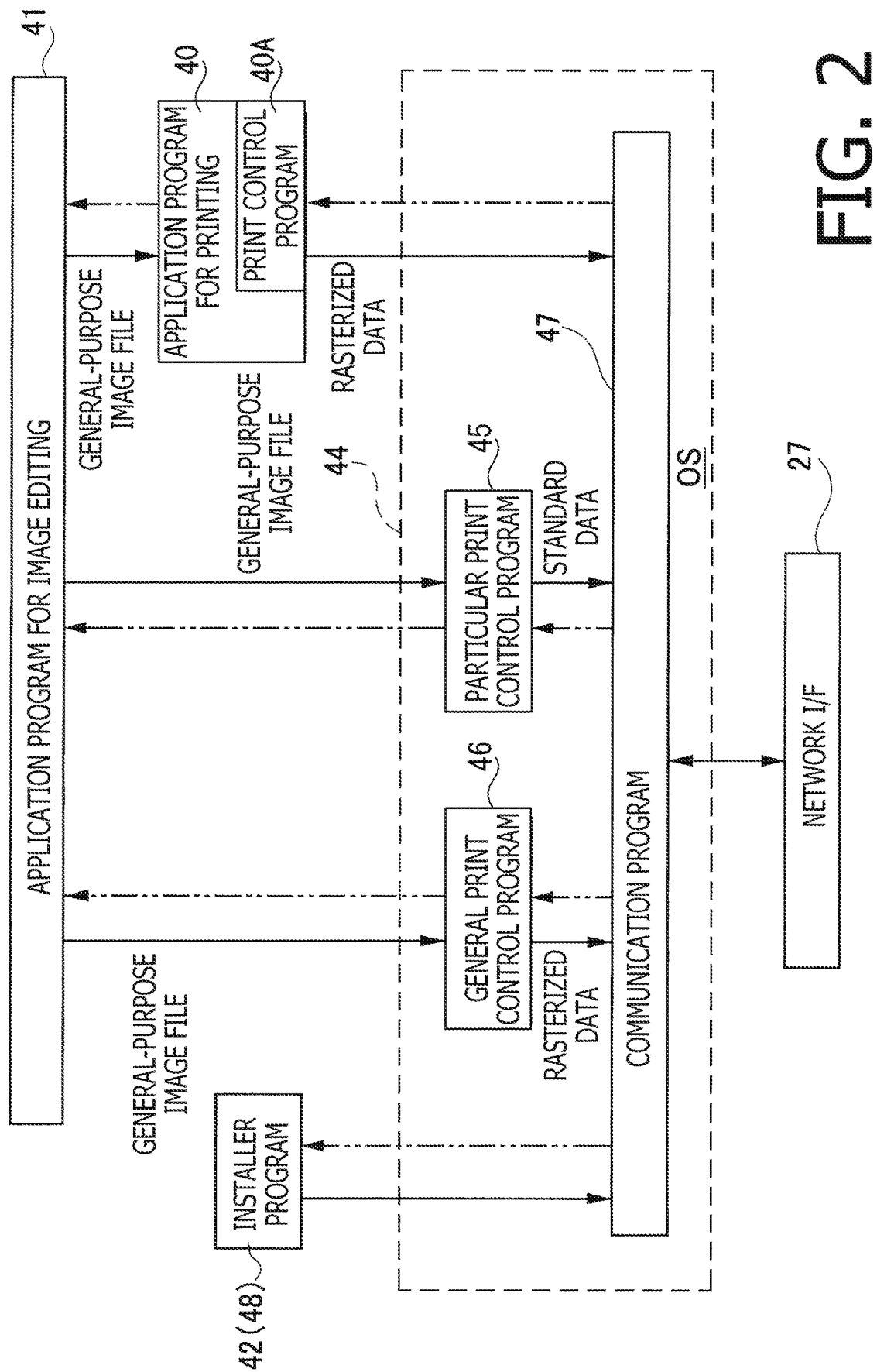
FIG. 2 is an illustration showing a functional relationship among programs stored in an information processing device included in the printing system in the first illustrative embodiment according to one or more aspects of the present disclosure.

As shown in FIG. 2, the non-volatile memory 24 of the information processing device 2 stores an application program 40 for printing, an application program 41 for image editing, an installer program 42, and an OS ("OS" is an abbreviation of "operating system") 44. Further, a particular print control program 45 for driverless control by the OS 44, a general print control program 46 as a driver program, and a communication program 47 may be incorporated in the OS 44.

It is noted that the application program 41 may not necessarily be limited to an application program for image editing, but, for instance, may be an application program for document creation or table creation. In FIG. 2, directions in which various kinds of data flow are indicated by solid arrows.

For instance, the application program 41 for image editing (hereinafter, which may be referred to as an "image editing application 41") is configured to achieve a function to accept a user instruction via the user I/F 26, a function to display an image on the user I/F 26, and a function to edit and save an image. In the first illustrative embodiment, for instance, the image editing application 41 is usable for generating and editing a label image file for the printer 1.

Further, the image editing application 41 is configured to achieve a function to read an already-generated label image file, a function to accept a print instruction, and a function to accept various settings for printing.

Further, as indicated by alternate long and two short dashes lines in FIG. 2, the image editing application 41 is configured to achieve a function to acquire state information on a state of the printer 1 from the printer 1 via one of the programs 40, 45, and 46. For instance, examples of the state information on the state of the printer 1 may include, but are not limited to, a print completion notification and an error notification.

The particular print control program 45 is configured to, when executed by the CPU 21, provide a function to generate standard data for printing that is written in a particular page description language, and a function to cause the communication program 47 to transmit the generated standard data, for example, to the printer 1. In most cases, the particular print control program 45 is a standard program provided by the OS 44 to achieve a print control function. Nonetheless, it is noted that it may depend on a version of the OS 44 whether the particular print control program 45 is a standard program provided by the OS 44 to achieve the print control function.

Thus, in order to perform printing according to the particular print control program 45, the printer 1 has a function to understand and rasterize the standard data written in the particular page description language and generate rasterized data necessary for the printing.

Further, the particular print control program 45 is applicable to various types of printers that support the particular page description language. Hence, any printer configured to support the particular page description language may perform printing based on the standard data, regardless of which manufacturer has made the printer.

It is noted that exemplary printing systems using the particular print control program 45 may include, but are not limited to, AirPrint (registered trademark) and Mopria (registered trademark). Further, examples of the particular page description language may include, but are not limited to, PostScript.

The general print control program 46 is configured to, when executed by the CPU 21, provide a function to generate rasterized data by rasterizing image data and a function to cause the communication program 47 to transmit the rasterized data to the printer 1. The general print control program 46 is provided by the vendor or the manufacturer of the printer 1 to achieve a print control function. The general print control program 46 is executable by the CPU 21 in a state where the general print control program 46 is incorporated in the OS 44.

Accordingly, as long as the printer 1 has a function to perform printing based on rasterized data, the printer 1 may perform printing according to the general print control program 46.

It is noted that exemplary printing systems using the general print control program 46 may include, but are not limited to, CUPS (registered trademark) ("CUPS" is an abbreviation of "Common UNIX (registered trademark) Printing System").

The application program 40 for printing (hereinafter, which may be referred to as the "printing application 40") includes a print control program 40A. The print control program 40A is configured to, when executed by the CPU 21, provide a function to generate rasterized data by rasterizing image data and a function to cause the communication program 47 to transmit the rasterized data to the printer 1. The printing application 40 is provided as an application program so as to achieve a print control function without using the particular print control program 45 or the general print control program 46.

In general, for instance, the general print control program 46 is not incorporated in the OS 44 just after the information processing device 2 has been newly purchased or the OS 44 has been upgraded to the latest version. Therefore, in this case, the user needs to install the general print control program 46, using a storage medium accompanying the printer 1.

Further, as described above, in most cases, the particular print control program 45 is previously incorporated in the OS 44. However, in some cases, for instance, depending on the version of the OS 44, the particular print control program 45 may not previously be incorporated in the OS 44. In such cases, the user may need to incorporate, into the OS 44, the particular print control program 45 downloaded from "xxx store" as a providing source of the particular print control program 45.

Further, in some cases, depending on the version of the OS 44, the general print control program 46 or the particular print control program 45 may not be compatible with the OS 44. In such cases, the user may need to search the Internet for the printing application 40 and incorporate the found printing application 40 into the information processing device 2.

Accordingly, the user is required to appropriately select the printing application 40, the particular print control program 45, and the general print control program 46 depending on the version of the OS 44 and to install the selected programs 40, 45, and 46 into the information processing device 2.

The installer program 42 is configured to, when booted by the user and thereafter executed by the CPU 21, activate an installer 43 (see FIG. 6).

Further, the installer program 42 is configured to, when executed by the CPU 21, cause the CPU 21 to communicate (i.e., transmit and receive) data with the server 5 via the communication program 47 of the OS 44, the network OF 27, and the Internet 6.

Therefore, when the user boots the installer program 42 to use the installer 43, for instance, the general print control program 46 is downloaded depending on the version of the OS 44 and automatically installed into the information processing device 2. Thus, the user does not need to select a program to be installed, depending on the version of the OS 44.

Subsequently, referring to FIG. 3, an explanation will be provided of an installation process to be performed by the information processing device 2 in the printing system 100 of the first illustrative embodiment. The installation process is performed by the CPU 21 of the information processing device 2 in response to the installer program 42 being selected by a user instruction via the user I/F 26 while the information processing device 2 is in operation.

In general, when the user needs to install at least one of the printing application 40, the particular print control program 45, and the general print control program 46 after purchasing the information processing device 2, the user selects and boots the installer program 42 via the user I/F 26. Further, when the user needs to install at least one of the printing application 40, the particular print control program 45, and the general print control program 46 after the OS 44 has been updated, the user selects and boots the installer program 42 via the user I/F 26.

First, the CPU 21 launches the installer program 42 in response to the installer program 42 being selected by a user instruction via the user I/F 26 (S10).

Next, the CPU 21 collects information on the OS 44 (S11). Specifically, in the first illustrative embodiment, the CPU 21 collects, as the information on the OS 44, version information regarding the version of the OS 44, directory information as to whether there is a directory prepared for the general print control program 46 in the OS 44, compatibility information as to whether the OS 44 is compatible with the particular print control program 45, and existence information as to whether the particular print control program 45 exists in the OS 44.

Nonetheless, the CPU 21 may collect, as the information on the OS 44, at least one of the version information, the directory information, the compatibility information, and the existence information. For instance, the CPU 21 may collect only the version information, or may collect the directory information in addition to the version information. Further, for instance, the CPU 21 may collect, as the information on the OS 44, any other combination including at least two of the version information, the directory information, the compatibility information, and the existence information.

Subsequently, the CPU 21 transmits, to the server 5, identification information based on the collected information on the OS 44 (S12). In the first illustrative embodiment, for instance, the identification information 59 contains a combination of the version information, the directory information, the compatibility information, and the existence information as collected in S11 (see FIG. 5). Further, in S12, the CPU 21 also transmits information (e.g., a model name) on the printer 1 to the server 5.

Nonetheless, the contents of the identification information 59 may not necessarily be limited to the aforementioned example. For instance, the identification information 59 may contain at least one of the version information, the directory information, the compatibility information, and the existence information. For instance, the identification information 59 may contain only the version information regarding the version of the OS 44 or contain a combination of the version information and the directory information as to whether there is a directory prepared for the general print control program 46 in the OS 44. Further, for instance, the identification information 59 may contain any other combination including at least two of the version information, the directory information, the compatibility information, and the existence information.

Next, the CPU 21 receives data from the server 5 (S13).

Subsequently, the CPU 21 determines whether the data received in S13 includes reception information (S14).

When determining that the data received in S13 includes reception information (S14: Yes), the CPU 21 goes to S15.

Meanwhile, when determining that the data received in S13 does not include reception information (S14: No), the CPU 21 goes back to S13.

Subsequently, from the received reception information, the CPU 21 determines whether the OS 44 is capable of accepting the general print control program 46, and extracts URL ("URL" is an abbreviation of "Uniform Resource Locator") information (S15).

Next, the CPU 21 accesses a location represented by the extracted URL information via the Internet 6, and downloads an adaptive installer, which is an example of a driverless installer, from the server 5 (S16).

Next, the CPU 21 executes the downloaded adaptive installer (S17). Afterward, the CPU 21 terminates the installation process shown in FIG. 3.

In the first illustrative embodiment, when executing the adaptive installer, the CPU 21 performs the following operations.

Specifically, for instance, when the identification information 59 includes version information of "10.15" (i.e., the version information representing that the version of the OS 44 is "10.15"), directory information of "no directory" (i.e., the directory information representing that there is no directory prepared for the general print control program 46 in the OS 44), compatibility information of "compatible" (i.e., the compatibility information representing that the OS 44 is compatible with the particular print control program 45), and existence information of "existing" (i.e., the existence information representing that the particular print control program 45 exists in the OS 44), the CPU 21 controls the user I/F 26 to display usage guide information on the particular print control program 45. For instance, the usage guide information on the particular print control program 45 may include information regarding how to boot, set, and use the particular print control program 45 incorporated in the OS 44.

Accordingly, the user may easily use the particular print control program 45 with reference to the usage guide information displayed on the user I/F 26.

At this time, the CPU 21 may control the user I/F 26 to display a notification representing that the general print control program 46 is unavailable under a current environment of the OS 44.

Further, for instance, when the identification information 59 includes version information of "10.14" (i.e., the version information representing that the version of the OS 44 is "10.14"), directory information of "directory prepared" (i.e., the directory information representing that there is a directory prepared for the general print control program 46 in the OS 44), compatibility information of "compatible" (i.e., the compatibility information representing that the OS 44 is compatible with the particular print control program 45), and existence information of "not existing" (i.e., the existence information representing that the particular print control program 45 does not exist in the OS 44), the CPU 21 boots an installer included in the adaptive installer and incorporates the general print control program 46 into the OS 44.

Further, the CPU 21 controls the user I/F 26 to display usage guide information on the general print control program 46. For instance, the usage guide information on the general print control program 46 may include information regarding how to boot, set, and use the general print control program 46 incorporated in the OS 44. Thereby, the user may easily use the general print control program 46.

At this time, the CPU 21 may control the user I/F 26 to display a notification representing that the particular print control program 45 is available under the current environment of the OS 44. Further, the CPU 21 may control the user I/F 26 to display acquisition information such as how to acquire the particular print control program 45 and a URL of "xxx store" as the providing source of the particular print control program 45. Further, at this time, the CPU 21 may control the user I/F 26 to display the usage guide information on the particular print control program 45 such as how to boot, set, and use the particular print control program 45.

Thus, when the OS 44 is compatible with the particular print control program 45, but the particular print control program 45 does not exist in the OS 44, the acquisition information such as how to acquire the particular print control program 45 and the URL of "xxx store" as the providing source of the particular print control program 45 is displayed on the user I/F 26. Therefore, the user may easily obtain the acquisition information such as how to acquire the particular print control program 45 and the URL of "xxx store" as the providing source of the particular print control program 45, without having to search the Internet or other sources for such type of information. In addition, the user may download the particular print control program 45 from the URL of "xxx store" as the providing source of the particular print control program 45, and may incorporate the downloaded particular print control program 45 into the OS 44.

In the first illustrative embodiment, when the particular print control program 45 is available under the current environment of the OS 44, the acquisition information such as how to acquire the particular print control program 45 and the URL of "xxx store" as the providing source of the particular print control program 45 is displayed on the user I/F 26. Nonetheless, in another exemplary case, after downloading an adaptive installer including the particular print control program 45 from the server 5, the CPU 21 may boot an installer included in the adaptive installer and incorporate the particular print control program 45 into the OS 44.

Further, for instance, when the identification information 59 includes version information of "10.13" (i.e., the version information representing that the version of the OS 44 is "10.13"), directory information of "directory prepared" (i.e., the directory information representing that there is a directory prepared for the general print control program 46 in the OS 44), compatibility information of "incompatible" (i.e., the compatibility information representing that the OS 44 is incompatible with the particular print control program 45), and existence information of "not existing" (i.e., the existence information representing that the particular print control program 45 does not exist in the OS 44), the CPU 21 boots the installer included in the adaptive installer and incorporates the general print control program 46 into the OS 44. Further, the CPU 21 controls the user I/F 26 to display the usage guide information on the general print control program 46 such as how to boot, set, and use the general print control program 46.

At this time, the CPU 21 may control the user I/F 26 to display a notification representing that the particular print control program 45 is unavailable under the current environment of the OS 44.

Thereby, the user may easily use the general print control program 46 with reference to the usage guide information displayed on the user I/F 26.

Further, for instance, when the identification information 59 includes version information of "9.12" (i.e., the version information representing that the version of the OS 44 is "9.12"), directory information of "no directory" (i.e., the directory information representing that there is no directory prepared for the general print control program 46 in the OS 44), compatibility information of "incompatible" (i.e., the compatibility information representing that the OS 44 is incompatible with the particular print control program 45), and existence information of "not existing" (i.e., the existence information representing that the particular print control program 45 does not exist in the OS 44), the CPU 21 boots an installer included in the adaptive installer and installs the printing application 40 into the information processing device 2. Further, the CPU 21 controls the user I/F 26 to display usage guide information on the printing application 40 such as how to boot, set, and use the printing application 40.

Thereby, the user may easily use the printing application 40 with reference to the usage guide information displayed on the user I/F 26.

Thus, in the first illustrative embodiment, when the OS 44 is not capable of accepting any of the print control programs 45 and 46, by installing the printing application 40, it is possible to avoid such an environment that the printer 1 is unavailable.

Subsequently, referring to FIG. 4, an explanation will be provided of a sub installation process to be performed by the server 5. The sub installation process is performed by the CPU 51 executing a sub installer program stored in the non-volatile memory 54 while the server 5 is in operation. The sub installation process is always performed as one of time-division multiplexing processes.

First, the CPU 51 receives the identification information 59 from the information processing device 2 (S20).

Then, based on the received identification information 59, the CPU 51 acquires adaptation information 60 from a table 58 (see FIG. 5) corresponding to the printer 1 (S21).

Next, based on contents of the acquired adaptation information 60, the CPU 51 selects an adaptive installer from among a plurality of installers, and stores the selected adaptive installer into the non-volatile memory 54 (S22).

Specifically, for instance, when the identification information 59 received from the information processing device 2 includes the version information of "10.15," the directory information of "no directory," the compatibility information of "compatible," and the existence information of "existing," the CPU 51 acquires, from the table 58 (see FIG. 5), adaptation information 60A as the adaptation information 60 associated with the received identification information 59.

Accordingly, based on the acquired adaptation information 60A, the CPU 51 selects an adaptive installer complying with the usage guide information such as how to boot, set, and use the particular print control program 45, and stores the selected adaptive installer into the non-volatile memory 54.

Further, for instance, when the identification information 59 received from the information processing device 2 includes the version information of "10.14," the directory information of "directory prepared," the compatibility information of "compatible," and the existence information of "not existing," the CPU 51 acquires, from the table 58 (see FIG. 5), adaptation information 60B as the adaptation information 60 associated with the received identification information 59.

Accordingly, based on the acquired adaptation information 60B, the CPU 51 selects an adaptive installer that complies with the general print control program 46, the acquisition information such as how to acquire the particular print control program 45 and the URL of "xxx store" as the providing source of the particular print control program 45, and the usage guide information such as how to boot, set, and use the general print control program 46 and the particular print control program 45. Then, the CPU 51 stores the selected adaptive installer into the non-volatile memory 54.

Further, for instance, when the identification information 59 received from the information processing device 2 includes the version information of "10.13," the directory information of "directory prepared," the compatibility information of "incompatible," and the existence information of "not existing," the CPU 51 acquires, from the table 58 (see FIG. 5), adaptation information 60C as the adaptation information 60 associated with the received identification information 59.

Accordingly, based on the acquired adaptation information 60C, the CPU 51 selects an adaptive installer complying with the general print control program 46 and the usage guide information such as how to boot, set, and use the general print control program 46. Then, the CPU 51 stores the selected adaptive installer into the non-volatile memory 54.

Further, for instance, when the identification information 59 received from the information processing device 2 includes the version information of "9.12," the directory information of "no directory," the compatibility information of "incompatible," and the existence information of "not existing," the CPU 51 acquires, from the table 58 (see FIG. 5), adaptation information 60D as the adaptation information 60 associated with the received identification information 59.

Accordingly, based on the acquired adaptation information 60D, the CPU 51 selects an adaptive installer complying with the printing application 40 and the usage guide information such as how to boot, set, and use the printing application 40. Then, the CPU 51 stores the selected adaptive installer into the non-volatile memory 54.

Subsequently, the CPU 51 transmits the reception information to the information processing device 2 (S23). The reception information includes a URL representing a location of the adaptive installer on the Web.

Next, in response to access from the information processing device 2, the CPU 51 transmits the adaptive installer to the information processing device 2 (S24). Afterward, the CPU 51 terminates the sub installation process shown in FIG. 4.

Subsequently, referring to FIG. 6, an explanation will be provided of a specific procedure of an installing process that is achieved through execution of the installation process (see FIG. 3) by the information processing device 2 and execution of the sub installation process (see FIG. 4) by the server 5.

Figure 3:
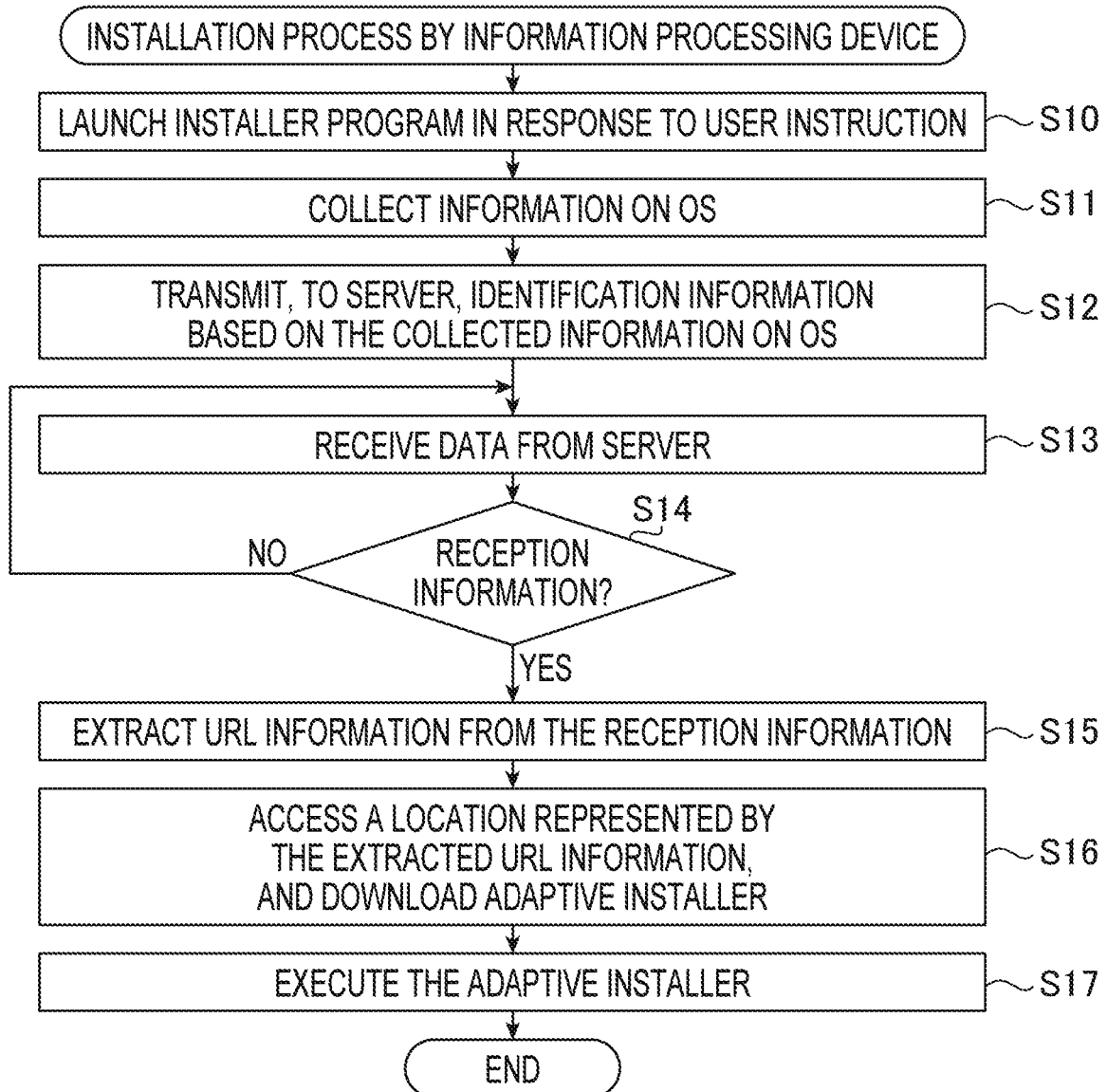
FIG. 3 is a flowchart showing a procedure of an installation process to be performed by the information processing device in the first illustrative embodiment according to one or more aspects of the present disclosure.

First, in T1, the CPU 21 of the information processing device 2 collects the information on the OS 44 (FIG. 3, S11).

Subsequently, in T2, the CPU 21 of the information processing device 2 transmits the identification information 59 to the server 5, based on the collected information on the OS 44 (FIG. 3, S12). At this time, the CPU 21 also transmits the information on the printer 1 to the server 5. This is because what matters is a relationship between the identification information 59 and the information on the printer 1 such as whether the printer 1 is compatible with the general print control program 46 and whether the printer 1 is compatible with the particular print control program 45.

Figure 4:
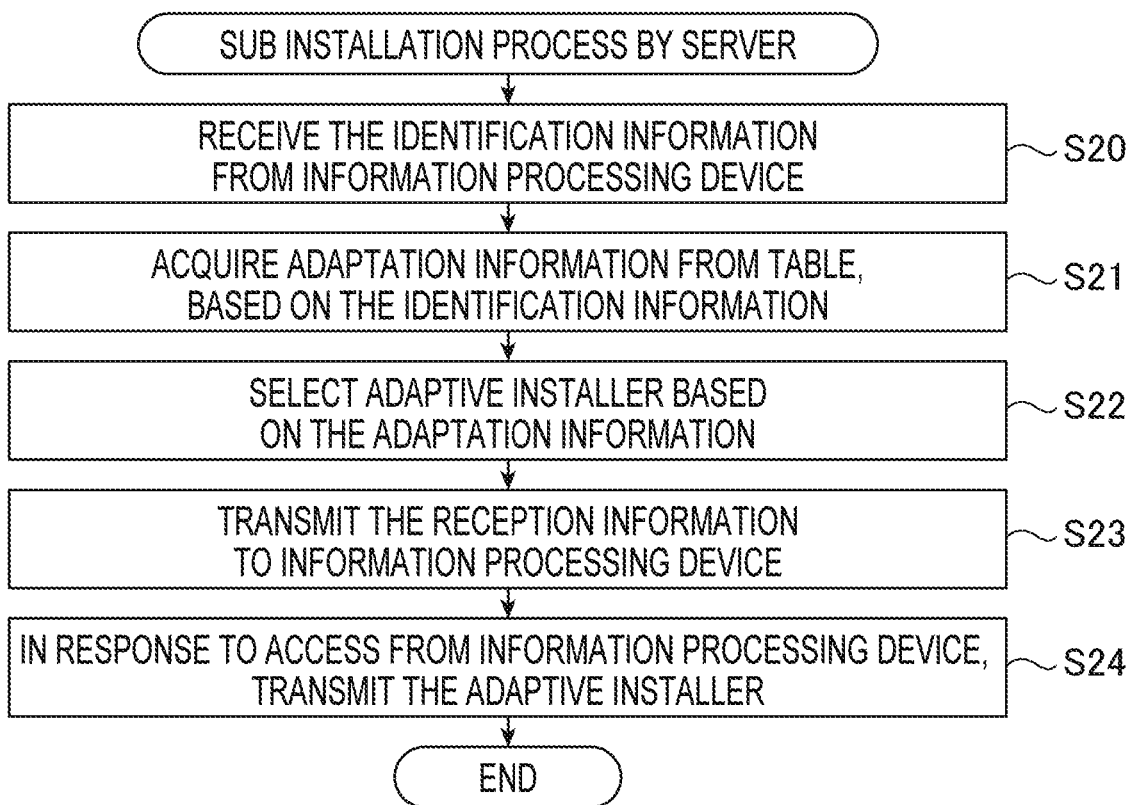
FIG. 4 is a flowchart showing a procedure of a sub installation process to be performed by a server included in the printing system in the first illustrative embodiment according to one or more aspects of the present disclosure.

Next, in T3, based on the identification information 59 and the information on the printer 1 received from the information processing device 2, the CPU 51 of the server 5 acquires the adaptation information 60 from the table 58 (see FIG. 5) corresponding to the printer 1, and selects an adaptive installer from among the plurality of installers, based on the acquired adaptation information 60 (FIG. 4, S21 to S22).

Next, in T4, the CPU 51 of the server 5 transmits, to the information processing device 2, the reception information including the URL representing the location of the adaptive installer on the Web (FIG. 4, S23).

Subsequently, in T5, the CPU 21 of the information processing device 2 extracts the URL information from the received reception information, and then accesses the location represented by the extracted URL information via the Internet 6 (FIG. 3, S15 to S16).

Subsequently, in T6, the CPU 51 of the server 5 transmits the adaptive installer to the information processing device 2 (FIG. 4, S24).

Next, in T7, the CPU 21 of the information processing device 2 executes the downloaded adaptive installer (FIG. 3, S17).

Thus, in the first illustrative embodiment, based on the identification information 59 of the OS 44, it may be determined whether the OS 44 is capable of accepting each of the print control programs 45 and 46. Further, when it is determined that the OS 44 is capable of accepting at least one of the print control programs 45 and 46, the at least one of the print control programs 45 and 46 may be installed into the information processing device 2. Hence, it is possible to avoid a useless operation to install a print control program that is not allowed to be incorporated into the OS 44 under the current environment of the OS 44. Therefore, even a user who does not have knowledge of the OS 44 may install a print control program or the printing application 40 that is suitable for the environment of the OS 44.

Additionally, the server 5 determines whether the OS 44 is capable of accepting each of the print control programs 45 and 46. Therefore, it is possible to determine whether the OS 44 is capable of accepting each of the print control programs 45 and 46, based on latest states of the OS 44 and the print control programs 45 and 46.

Second Illustrative Embodiment

Hereinafter, a second illustrative embodiment according to aspects of the present disclosure will be described with reference to the accompanying drawings. In the second illustrative embodiment, aspects of the present disclosure are applied to a printing system including a printer and an information processing device that are communicably interconnected. In the following description, substantially the same elements as exemplified in the aforementioned first illustrative embodiment will be provided with the same reference characters, respectively.

In the aforementioned first illustrative embodiment, the general print control program 46 is stored in the server 5, and is installed into the information processing device 2 after the adaptive installer is downloaded from the server 5 to the information processing device 2. In the second illustrative embodiment, an installer program 48 shown in FIG. 2 includes the general print control program 46. In other words, the second illustrative embodiment is different from the aforementioned first illustrative embodiment in that an installer 49 (see FIG. 9), which is activated when the installer program 48 is executed by the CPU 21 after booted by the user, includes the general print control program 46.

First, referring to FIG. 7, an explanation will be provided of an installation process to be performed by the information processing device 2. In the following description, substantially the same steps as shown in FIG. 3 in the aforementioned first illustrative embodiment will be provided with the same reference characters, respectively, and different steps will primarily be described.

When determining that the data received in S13 includes reception information (S14: Yes), the CPU 21 extracts availability information from the reception information (S30).

Subsequently, based on the extracted availability information, the CPU 21 determines whether the general print control program 46 is available (S31).

Then, when determining that the general print control program 46 is available (S31: Yes), the CPU 21 installs the general print control program 46, which is included in the installer program 48 (i.e., the installer 49 activated by execution of the installer program 48), into the information processing device 2 (S31). In other words, in S31, the CPU 21 incorporates the general print control program 46 into the OS 44. Meanwhile, when determining that the general print control program 46 is unavailable (S31: No), the CPU 21 goes to S15, and extracts URL information from the reception information in the same manner as executed in the aforementioned first illustrative embodiment (see FIG. 3).

Thus, in the second illustrative embodiment, there is no need to download the general print control program 46 from the server 5. Therefore, even under an unfavorable environment for communication between the information processing device 2 and the server 5, it is possible to install the general print control program 46 into the information processing device 2. Thus, in this case, it is convenient that an appropriate print control program is automatically installed with no need for the user to be conscious of the version of the OS 44.

Next, referring to FIG. 8, an explanation will be provided of a sub installation process to be performed by the server 5. In the following description, substantially the same steps as shown in FIG. 4 in the aforementioned first illustrative embodiment will be provided with the same reference characters, respectively, and different steps will primarily be described.

After acquiring the adaptation information 60 from the table 58 (see FIG. 5) corresponding to the printer 1 based on the received identification information 59 (S21), the CPU 51 determines whether the general print control program 46 is available for the OS 44 of the information processing device 2, based on the adaptation information 60 (S35). When determining that the general print control program 46 is available for the OS 44, based on the adaptation information 60 (S35: Yes), the CPU 51 transmits the reception information including the availability information to the information processing device 2 (S36). Afterward, the CPU 51 terminates the sub installation process shown in FIG. 8.

Meanwhile, when determining that the OS 44 is not allowed to use the general print control program 46 (S35: No), the CPU 51 goes to S22. In S22, as described above, based on the contents of the acquired adaptation information 60, the CPU 51 selects an adaptive installer from among the plurality of installers, and stores the selected adaptive installer into the non-volatile memory 54.

Thus, in the second illustrative embodiment, the CPU 51 selects an adaptive installer only when determining that the OS 44 is not allowed to use the general print control program 46 (S35: No). Since the steps S23 and S24 are substantially the same as those shown in FIG. 4 in the aforementioned first illustrative embodiment, an explanation thereof will be omitted.

Subsequently, referring to FIG. 9, an explanation will be provided of a specific procedure of an installing process that is achieved through execution of the installation process (see FIG. 7) by the information processing device 2 and execution of the sub installation process (see FIG. 8) by the server 5. In the following description, substantially the same steps as shown in FIG. 6 in the aforementioned first illustrative embodiment will be provided with the same reference characters, respectively, and different steps will primarily be described.

Specifically, when the general print control program 46 is available for the OS 44, in T10, the CPU 51 of the server 5 transmits the reception information including the availability information to the information processing device 2 (FIG. 8, S36).

Next, in T11, the CPU 21 of the information processing device 2 installs the general print control program 46 included in the installer program 48 into the OS 44 (FIG. 7, S32).

Meanwhile, when the general print control program 46 is unavailable for the OS 44 of the information processing device 44, in T12, the CPU 51 of the server 5 acquires the adaptation information 60 from the table 58 (see FIG. 5) based on the received identification information 59, and thereafter selects an adaptive installer from among the plurality of installers, based on the acquired adaptation information 60 (FIG. 8, S21 to S22).

Subsequently, in T4, the CPU 51 of the server 5 transmits, to the information processing device 2, the reception information including the URL representing the location of the adaptive installer on the Web (FIG. 8, S23).

Next, in T13, the CPU 21 of the information processing device 2 extracts the URL information from the received reception information, and then accesses the location represented by the extracted URL information via the Internet 6 (FIG. 7, S15 to S16).

Next, in T14, the CPU 51 of the server 5 transmits the adaptive installer to the information processing device 2 (FIG. 8, S24).

Then, in T15, the CPU 21 of the information processing device 2 executes the downloaded adaptive installer (FIG. 7, S17).

Thus, in the second illustrative embodiment, the information processing device 2 may install a print control program into the information processing device 2 without having to receive the print control program from the server 5. Thereby, it is possible to complete the installing operation promptly and reduce useless communication.

Third Illustrative Embodiment

Hereinafter, a third illustrative embodiment according to aspects of the present disclosure will be described with reference to FIG. 10. In the third illustrative embodiment, aspects of the present disclosure are applied to a printing system including a printer and an information processing device that are communicably interconnected. In the following description, substantially the same elements as exemplified in the aforementioned first illustrative embodiment will be provided with the same reference characters, respectively.

In the aforementioned first illustrative embodiment, the server 5 stores therein the table 58 shown in FIG. 5, and acquires the adaptation information 60 based on the identification information 59 received from the information processing device 2. However, the third illustrative embodiment is different from the aforementioned first illustrative embodiment in that the information processing device 2 stores therein the table 58 shown in FIG. 5.

Specifically, in T1, the CPU 21 of the information processing device 2 collects the information on the OS 44.

Subsequently, in T20, the CPU 21 of the information processing device 2 acquires the adaptation information 60 from the table 58 shown in FIG. 5, and thereafter transmits the acquired adaptation information 60 to the server 5.

Next, in T21, the CPU 51 of the server 5 selects an adaptive installer from among the plurality of installers, based on the received adaptation information 60.

Fourth Illustrative Embodiment

Hereinafter, a fourth illustrative embodiment according to aspects of the present disclosure will be described with reference to FIG. 11. In the third illustrative embodiment, aspects of the present disclosure are applied to a printing system including a printer and an information processing device that are communicably interconnected. In the following description, substantially the same elements as exemplified in the aforementioned first and second illustrative embodiments will be provided with the same reference characters, respectively.

In the aforementioned second illustrative embodiment, the server 5 stores the table 58 shown in FIG. 5 and acquires the adaptation information 60 based on the identification information 59 received from the information processing device 2. However, the fourth illustrative embodiment is different from the aforementioned second illustrative embodiment in that the information processing device 2 stores the table 58 shown in FIG. 5.

Specifically, in T1, the CPU 21 of the information processing device 2 collects the information on the OS 44.

Subsequently, in T30, the CPU 21 of the information processing device 2 acquires the adaptation information 60 from the table 58 shown in FIG. 5. Then, when determining that the general print control program 46 is available for the OS 44 of the information processing device 2, based on the acquired adaptation information 60, the CPU 21 installs into the OS 44 the general print control program 46 included in the installer program 48.

Meanwhile, in T31, when determining that the general print control program 46 is available for the OS 44 of the information processing device 2, based on the acquired adaptation information 60, the CPU 21 of the information processing device 2 transmits the adaptation information 60 to the server 5.

Next, in T32, the CPU 51 of the server 5 selects an adaptive installer from among the plurality of installers, based on the received adaptation information 60.

Thus, in the fourth illustrative embodiment, the information processing device 2 may independently determine the environment of the OS 44. Hence, even though a network environment is unavailable, the information processing device 2 may install the general print control program 46 into the OS 44.

Hereinabove, the illustrative embodiments according to aspects of the present disclosure have been described. The present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure may be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, the following modifications according to aspects of the present disclosure are feasible.

The printer 1 may not necessarily include the operation I/F 13. Further, instead of the non-volatile memory 24, the information processing device 2 may include any other type of large-capacity storage device.

Further, the communication system applicable between the printer 1 and the information processing device 2 is not limited to the wireless communication complying with Wi-Fi (registered trademark) standards. For instance, examples of the communication system applicable between the printer 1 and the information processing device 2 may include wired communication using a USB cable, and wireless communication complying with any other type of standards such as Bluetooth (registered trademark) standards. Further, for instance, a plurality of communication systems may be available between the printer 1 and the information processing device 2.

Further, in the aforementioned first to fourth illustrative embodiments, the determination as to whether the OS 44 is capable of accepting each of the print control programs 45 and 46 is made using the table 58. Nonetheless, the determination may be made using a capability determination program for determining the capability of the OS 44. The capability determination program may be created by programming the contents of the table 58 shown in FIG. 5.

Further, in the aforementioned first to fourth illustrative embodiments, the server 5 selects an adaptive installer based on the adaptation information 60. Nonetheless, for instance, based on the identification information 59 or the table 58, customization information may be generated. In this case, a customized installer may be created based on the generated customization information.

Further, each process/operation as exemplified in the aforementioned illustrative embodiments may be performed by one or more CPUs, one or more hardware elements such as ASICs, or a combination including at least two of CPUs and hardware elements such as ASICs. Moreover, each process/operation as exemplified in the aforementioned illustrative embodiments may be performed in accordance with a processor-implementable method or computer-readable instructions stored in a non-transitory computer-readable medium.

Associations between elements exemplified in the aforementioned illustrative embodiments and elements according to aspects of the present disclosure will be exemplified below. The information processing device 2 may be an example of an "information processing device" according to aspects of the present disclosure. The printer 1 may be an example of a "device" according to aspects of the present disclosure. Further, an image scanner may be included in examples of the "device" according to aspects of the present disclosure. The server 5 may be an example of a "server" according to aspects of the present disclosure. The CPU 21 of the information processing device 2 may be an example of a "processor" according to aspects of the present disclosure. The network I/F 27 of the information processing device 2 may be an example of a "communication interface" according to aspects of the present disclosure. The user I/F 26 of the information processing device 2 may be an example of a "user interface" according to aspects of the present disclosure. The non-volatile memory 24 of the information processing device 2 may be an example of a "non-transitory computer-readable medium" according to aspects of the present disclosure. Examples of "computer-readable instructions" according to aspects of the present disclosure may include the installer programs 42 and 48. The OS 44 of the information processing device 2 may be an example of an "OS" according to aspects of the present disclosure. The general print control program 46 may be an example of a "driver program" according to aspects of the present disclosure. The application program 40 for printing that includes the print control program 40A may be an example of an "application program" according to aspects of the present disclosure. The URL information may be an example of "location information" according to aspects of the present disclosure. The CPU 21 executing S11 may be an example of an "acquiring means" according to aspects of the present disclosure. The CPU 21 executing the steps S12 to S15 (see FIG. 3) may be an example of a "determining means" according to aspects of the present disclosure. Further, the CPU 21 executing the steps S12 to S31 (see FIG. 7) may be an example of the "determining means" according to aspects of the present disclosure. The CPU 21 executing S16 may be an example of a "downloading means" according to aspects of the present disclosure. The CPU 21 executing S17 may be an example of an "installing means" according to aspects of the present disclosure.

What is claimed is:

1. A non-transitory computer-readable medium storing computer-readable instructions configured to, when executed by a processor of an information processing device, cause the information processing device to:
   acquire identification information for identifying an OS of the information processing device;
   based on the acquired identification information, determine whether the OS is capable of accepting a driver program for controlling a device;
   when determining that the OS is capable of accepting the driver program, install the driver program into the OS; and
   when determining that the OS is incapable of accepting any driver program for controlling the device, download, into the information processing device, a driverless installer for installing a printing application to achieve driverless control of the device without using any driver program.

2. The non-transitory computer-readable medium according to claim 1,
   wherein the instructions are further configured to, when executed by the processor, cause the information processing device to:
   transmit the acquired identification information to a server via a communication interface of the information processing device;
   receive reception information from the server, the reception information being transmitted by the server in response to the server receiving the identification information, the reception information representing whether the OS is capable of accepting the driver program;
   when the received reception information represents that the OS is capable of accepting the driver program, determine that the driver program is executable by the processor; and
   when the received reception information represents that the OS is incapable of accepting the driver program, determine that the driver program is unexecutable by the processor.

3. The non-transitory computer-readable medium according to claim 1,
wherein the instructions are further configured to, when executed by the processor, cause the information processing device to:
when determining that the OS is capable of accepting the driver program, receive location information from a server via a communication interface of the information processing device, the location information representing a location where an installer for the driver program is stored;
access the location represented by the location information and receive the installer for the driver program via the communication interface; and
boot the received installer for the driver program, thereby installing the driver program.

4. The non-transitory computer-readable medium according to claim 1,
wherein the instructions are further configured to, when executed by the processor, cause the information processing device to:
using the identification information, determine whether the driver program is available;
when determining that the driver program is available, install the driver program included in the instructions; and
when determining that the driver program is unavailable, perform:
receiving location information from a server via a communication interface of the information processing device, the location information representing a location where the driverless installer is stored;
accessing the location represented by the location information and receiving the driverless installer via the communication interface; and
booting the received driverless installer.

5. The non-transitory computer-readable medium according to claim 1,
wherein the instructions are further configured to, when executed by the processor, cause the information processing device to provide, via a user interface, guide information regarding settings in the OS as a notification about how to control the device.

6. The non-transitory computer-readable medium according to claim 1,
wherein the instructions are further configured to, when executed by the processor, cause the information processing device to:
when determining that the OS is incapable of accepting the driver program, determine whether driverless control by the OS is acceptable for the device to be controlled; and
when determining that the driverless control by the OS is not acceptable for the device to be controlled, install the printing application into the information processing device.

7. The non-transitory computer-readable medium according to claim 6,
wherein the instructions are further configured to, when executed by the processor, cause the information processing device to:
receive location information from a server via a communication interface of the information processing device, the location information representing a location where an installer for the printing application is stored;
access the location represented by the location information and receive the installer for the printing application via the communication interface; and
boot the received installer for the printing application, thereby installing the printing application.

8. An information processing device comprising:
an acquiring means configured to acquire identification information for identifying an OS of the information processing device;
a determining means configured to determine, based on the acquired identification information, whether the OS is capable of accepting a driver program for controlling a device;
an installing means configured to install, when determining that the OS is capable of accepting the driver program, the driver program into the OS; and
a downloading means configured to download, when determining that the OS is incapable of accepting any driver program for controlling the device, a driverless installer for installing a printing application to achieve driverless control of the device without using any driver program, into the information processing device.

9. A method implementable on a processor of an information processing device, the method comprising:
acquiring identification information for identifying an OS of the information processing device;
determining, based on the acquired identification information, whether the OS is capable of accepting a driver program for controlling a device;
installing, when determining that the OS is capable of accepting the driver program, the driver program into the OS; and
downloading, when determining that the OS is incapable of accepting any driver program for controlling the device, a driverless installer for installing a printing application to achieve driverless control of the device without using any driver program, into the information processing device.

* * * * *